March 25, 1947. T. BARISH 2,417,855
DISC BRAKE
Filed May 29, 1945

Inventor
THOMAS BARISH

By Scrivener & Parker
Attorneys

Patented Mar. 25, 1947

2,417,855

UNITED STATES PATENT OFFICE 2,417,855

DISC BRAKE

Thomas Barish, University Park, Md., assignor to Engineering and Research Corporation, Riverdale, Md., a corporation of Maryland Application May 29, 1945, Serial No. 596,458

3 Claims. (Cl. 188—72)

This invention relates to brakes and, more particularly, to disc brakes. Such braking devices comprise a disc connected to the wheel and rotatable therewith, at least one non-rotatable disc positioned adjacent and parallel to the wheel-connected disc and some means, which may be hydraulic or mechanical in operation, for moving the discs into braking engagement with each other.

A new and improved wheel and brake assembly, embodying a disc brake of this general type is disclosed and claimed in my co-pending application Serial No. 596,457, and it has been the principal object of this invention to provide a disc brake of new, improved and simplified structure and operation for braking use in general and, in particular, for use with the wheel and brake assembly of my aforesaid co-pending application.

Another of the objects of the invention has been to provide an improved and simplified structure for housing the operating means of a disc brake of the described type, which operating means may be easily and cheaply formed of stamped metal and quickly and simply installed.

Another object of the invention has been to provide a disc brake of the described type having a friction facing which is directly engaged by the brake-operating means.

Another object has been to provide a new and improved supporting means for the non-rotatable friction element of a disc brake, by means of which the housing for the brake-operating means supports the friction element and holds it from rotation.

Other objects and features of novelty of the invention will be made apparent by the following description and the annexed drawings which, it will be understood, are only illustrative of the invention and impose no limitation thereon not imposed by the appended claims.

Figure 1:
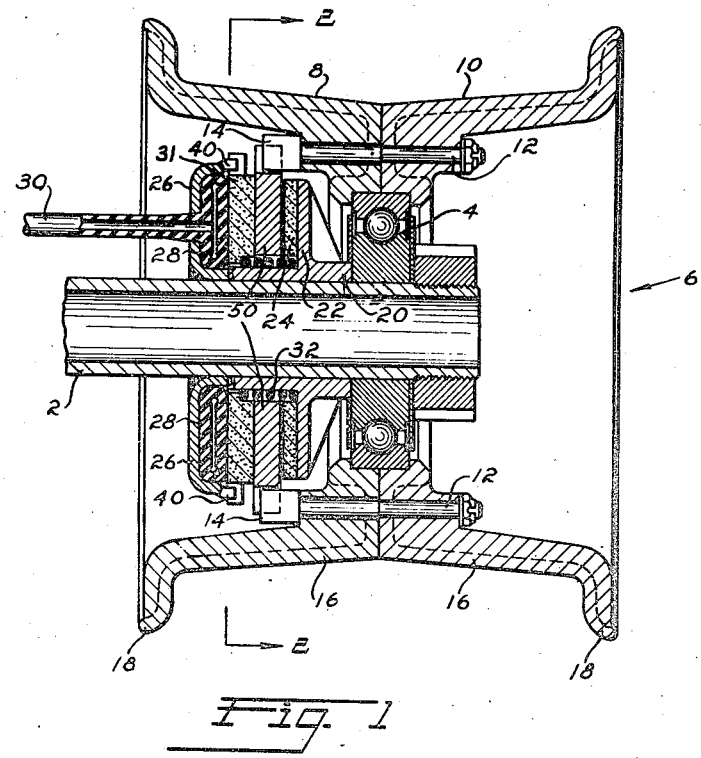
Figure 2:
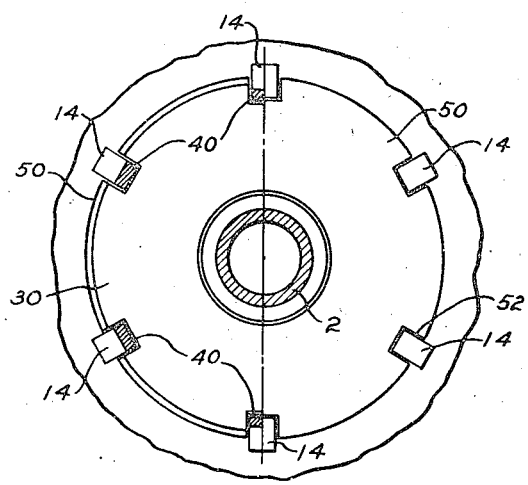

Referring to the drawings, in which similar reference numerals refer to like parts, Fig. 1 is a cross-sectional view through a wheel and brake assembly including the new and improved braking means provided by the invention, and Fig. 2 is a partial sectional view taken on line 2—2 of Fig. 1.

An improved wheel and brake assembly according to my invention is disclosed in the drawings and comprises a fixed axle 2 on which, adjacent the outer end, is received the inner race of a bearing 4 having a single row of balls. The outer race of the bearing is attached centrally of the web of a wheel 6 which is formed in two sub- stantially identical cylindrical parts 8, 10 the abutting faces of which are co-planar with the centers of the balls of bearing 4. The two halves of the wheel are connected by a circular series of bolts 12 which extend through the web of the wheel and at their one ends have heads 14 which are preferably square in cross-section but which may have any other suitable cross-sectional shape, for a purpose to be described hereinafter. Each of the two parts of the wheel is provided with a generally cylindrical tire-receiving rim 16 having an axially-displaced tire-retaining flange 18.

Means are provided by the invention for stopping the rotation of the wheel. Such means are disposed within or beneath the flange 16 on one side of the bearing 4 and between the bearing and the tire-retaining flange 18 on the same side of the bearing.

These brake means comprise a non-rotatable sleeve 20 which surrounds the axle 2 and one end of which abuts with a side face of the inner race of bearing 4, forming an abutment therefor. An annular flange 22 extends radially outwardly from sleeve 20 intermediate the ends thereof, is preferably integral therewith, and on the inner face thereof, i. e. the face facing away from the bearing 4, has attached thereto an annular friction disc 24. Also surrounding the axle, and connected thereto by suitable means such as welding and connected to the adjacent end of sleeve 20 by being keyed thereto, is an annular backing member 26 which is C-shaped in cross-section through each section extending outwardly from the axle, and within which is disposed an annular, hollow, expansible tube 28 which is connected by conduit 30 to a source of fluid under pressure, by which the tube may be inflated. The annular backing member 26 is spaced from the flange 22 and friction facing 24 in a direction away from bearing 4 and is so positioned that it opens toward the flange 22. An annular disc 31 which is formed of friction material is disposed within the space between the backing member 26 and friction facing 24 and is positioned closely adjacent the open, or inner, side of the backing member. A helical compression spring 32 surrounds the axle 2 and is positioned between the disc 31 and flange 22 and is operable to constantly force the disc 31 toward the member 26 and into engagement with the expansible tube 28 therein.

Means are provided by the invention for supporting the friction disc 31 in the described position and for preventing rotation thereof. Such means comprise an annular series of fingers 40 which are formed integrally with the periphery of the outer edge of the C-shaped backing member and which extend axially therefrom toward flange 22, and an annular series of openings formed in the outer peripheral edge of friction disc 31 and into which the fingers 40 extend. The fingers and openings are of approximately the same size, whereby the disc is supported about the axle and is held from rotation, but is permitted axial movement by sliding engagement between the fingers and the openings in which they are received.

A rotatable brake disc 50 surrounds the axle 2 and is positioned between the disc 31 and the friction facing 24. This brake disc is provided in its outer peripheral edge with an annular series of apertures 52 within which the heads 14 of bolts 12 are respectively received, whereby the disc 50 is supported about the shaft for rotation with the wheel and for axial movement with respect thereto.

In the operation of the described device, the brake disc 50 normally rotates with the wheel. The spring 32 holds the friction disc 31 out of engagement therewith and urges the disc into engagement with the expansible tube 28, compressing the same. No force is exerted on brake disc 50 in such a direction as to cause it to engage friction facing 24 and consequently there is no frictional engagement between these parts. When it is desired to operate the brake, fluid under pressure is forced into expansible tube 28 through conduit 30, thereby expanding the same and forcing disc 31 axially into engagement with brake disc 50, which is thus forced axially into engagement with the fixed friction facing 24, thus causing the wheel supported braking disc 50 to be clamped between the two non-rotatable discs. It will be seen that the inter-engagement between the fingers 40 on cylinder 26 and the apertures in friction disc 31 will prevent any rotational movement of disc 31 when it engages the rotating brake disc 50, while at the same time permitting free axial movement of the disc.

One of the principal features of the invention is the direct engagement between the friction disc 31 and the actuating member 28, this being in distinction to the usual structure and arrangement, wherein the friction member is mounted as a facing on a backing plate. The direct engagement between the friction facing and the actuator requires that heat developed in the friction member during a braking operation be removed quickly in order to avoid overheating of the expansible tube 28. This removal of heat is facilitated by the inter-engagement between the fingers 40 of the backing member 26 and the apertures in the periphery of the friction member, whereby the member 26 conducts the heat away from the friction member and to the axle.

While I have described and illustrated but one embodiment of my invention, it will be apparent to those skilled in the art that other embodiments, as well as modifications of that disclosed, may be made without departing in any way from the spirit or scope of the invention, for the limits of which reference must be had to the appended claims.

What is claimed is:

1. A disc brake for an airplane having a non-rotatable axle and a wheel rotatably journaled on the axle, comprising a sleeve surrounding and fixed to the axle and having an annular flange extending radially outwardly therefrom, a friction facing fixed to one face of said flange, a backing and supporting member surrounding and fixed to said axle and being C-shaped through each section thereof radial to the outer periphery of the axle with the open part of the C-shaped section facing and spaced from said friction facing, a disc formed of friction material surrounding the axle between said friction facing and the backing and supporting member and being positioned closely adjacent the open face thereof, interengaging means formed respectively on one of the peripheral edges of said backing and supporting member and directly on said friction disc for preventing rotation of said disc while permitting axial movement thereof, a brake disc connected to the wheel for rotation therewith and movement axially thereof and disposed between said friction facing and said friction disc, and means disposed within said backing and supporting member and directly engaging said friction disc and operable to move said friction disc axially toward said brake disc.

2. A disc brake for an airplane having a non-rotatable axle and a wheel rotatably journaled on the axle, comprising a sleeve surrounding and fixed to the axle and having an annular flange extending radially outwardly therefrom, a friction facing fixed to one face of said flange, a backing and supporting member surrounding and fixed to said axle and being C-shaped through each section thereof radial to the outer periphery of the axle with the open part of the C-shaped section facing and spaced from said friction facing, a disc formed of friction material surrounding the axle between said friction facing and the backing and supporting member and being positioned closely adjacent the open face thereof and having a plurality of spaced openings formed directly in one of the peripheral edges thereof, a plurality of spaced fingers extending axially from one of the peripheral edges of said backing and supporting member into said openings for preventing rotation of said disc while permitting axial movement thereof, a brake disc connected to the wheel for rotation therewith and movement axially thereof and disposed between said friction facing and said friction disc, and means disposed within said backing and supporting member and directly engaging said friction disc and operable to move said friction disc axially toward said brake disc.

3. A disc brake for an airplane having a non-rotatable axle and a wheel rotatably journaled on the axle, comprising a sleeve surrounding and fixed to the axle and having an annular flange extending radially outwardly therefrom, a friction facing fixed to one face of said flange, a backing and supporting member surrounding and fixed to said axle and being C-shaped through each section thereof radial to the outer periphery of the axle with the open part of the C-shaped section facing and spaced from said friction facing, a disc formed of friction material surrounding the axle between said friction facing and the backing and supporting member and being positioned closely adjacent the open face thereof and having an annular series of spaced openings formed directly in the outer periphery thereof, an annular series of spaced fingers extending axially from the outer peripheral edge of said backing and supporting member into said openings for preventing rotation of said disc while permitting axial movement thereof, a brake disc connected to the wheel for rotation therewith and movement axially thereof and disposed between said friction facing and said friction disc, and means disposed within said backing and supporting member and directly engaging said friction disc and operable to move said friction disc axially toward said brake disc.

THOMAS BARISH.

REFERENCES CITED

The following references are of record in the file of this patent:

UNITED STATES PATENTS

| Number | Name | Date |
|---|---|---|
| 670,948 | Carlson | Apr. 2, 1901 |
| 1,594,899 | Fetter | Aug. 3, 1926 |
| 2,017,715 | Goodyear et al. | Oct. 14, 1935 |